June 24, 1947. W. H. BAGLEY, JR 2,422,999
METHOD OF AND APPARATUS FOR MOLDING PLASTIC MATERIAL
Filed April 27, 1945 2 Sheets-Sheet 2
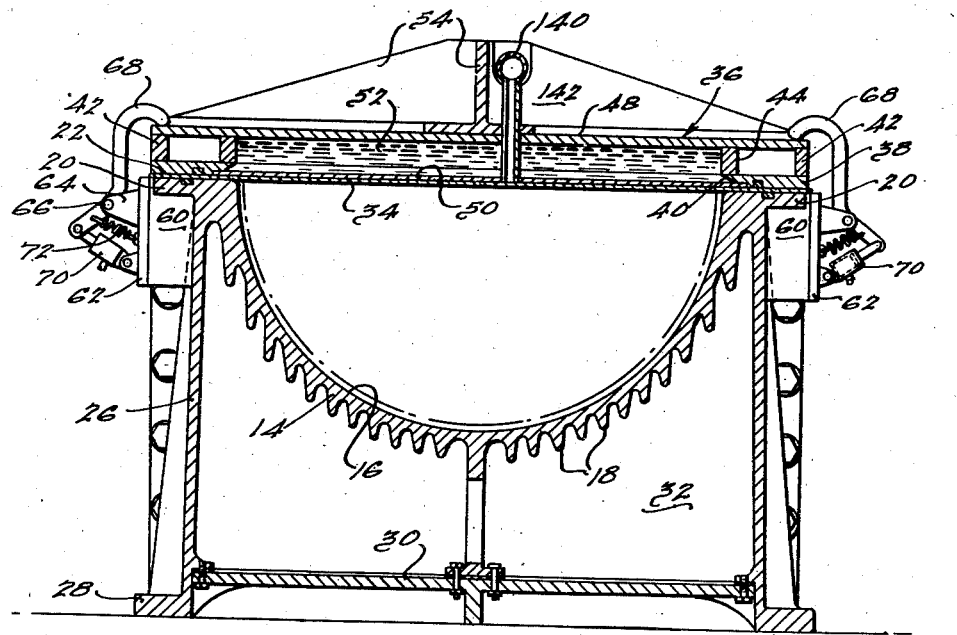
INVENTOR.
William Harold Bagley, Jr.
BY
Harness, Dickey & Pierce.
ATTORNEYS.

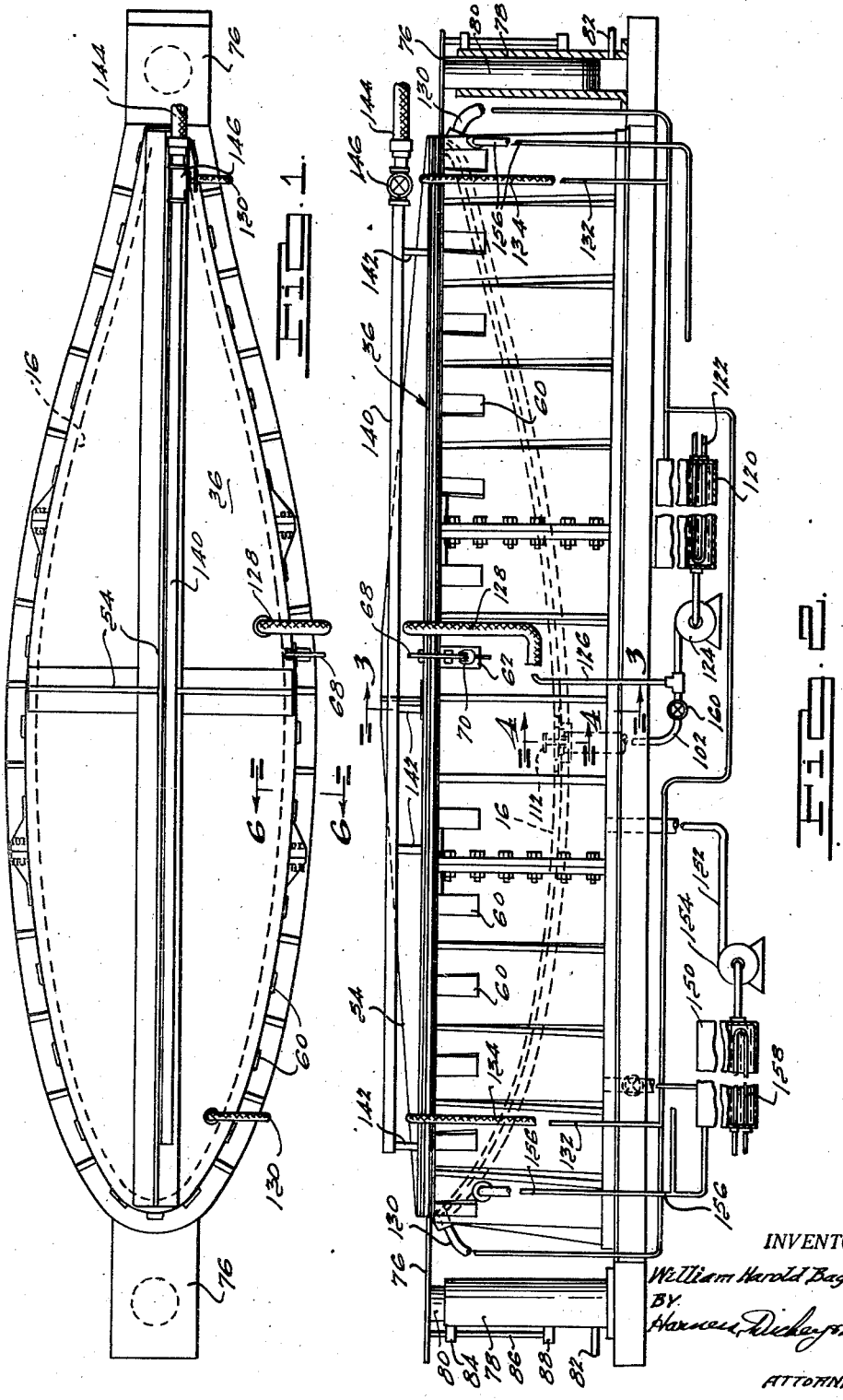

Patented June 24, 1947

2,422,999

UNITED STATES PATENT OFFICE 2,422,999

METHOD OF AND APPARATUS FOR MOLDING PLASTIC MATERIAL

William Harold Bagley, Jr., Detroit, Mich., assignor of one-half to Progressive Welder Company, Detroit, Mich., a corporation of Michigan Application April 27, 1945, Serial No. 590,557

12 Claims. (Cl. 18—19)

This invention relates to the molding plastic bodies and has for its principal object the provision of an improved method and apparatus for accomplishing such molding.

Objects of the invention include the provision of a method of acting upon a flat sheet of plastic material whereby to permanently deform such sheet to conform to the size, shape and contour of a desired finished product; the provision of a method for accomplishing the above-described result including the step of applying heat to the plastic sheet to rend it readily moldable, then applying fluid pressure to the sheet to cause it to conform to the size, shape and contour of the co-operating mold part, and then cooling the material to fix it in its molded form; the provision of a method as above described including the step of applying heat to the opposite sides of the flat sheet prior to deformation thereof; the provision of a method as above described in which the application of heat to one face of the flat sheet is accomplished through contact of such face with a heated liquid; the provision of a method as above described in which heat is applied to the opposite faces of the sheet of plastic material; the provision of a method as above described in which the fluid pressure employed for deforming the sheet is air pressure; and the provision of a method as above described in which the cooling of the molded material is accomplished by cooling the mold by means of a refrigerated coolant.

Other objects of the invention include the provision of apparatus for molding plastic sheets comprising a mold having a depression therein of the size, shape and contour of the exterior of the desired final product, together with a cover member for the open side thereof co-operable with the mold part to clamp a sheet of the plastic material between it and the mold, means being provided for filling the depression of the mold with heated fluid directly contacting the sheet of plastic material, and for heating the cover member, together with means for introducing fluid under pressure between the cover member and the sheet of plastic material to cause the sheet of plastic material, softened under the influence of the heat of the liquid and cover, to be deformed and be caused to conform to the depression of the mold; the provision of a construction as above described in which the cover member is adapted for flat contacting relationship with respect to one surface of the sheet of plastic material; the provision of a construction as above described in which means are provided for circulating a heating medium through the cover member, and for filling the mold depression with a heated liquid at will; the provision of the construction above described including means operable to bathe the exterior surface of the mold depression-forming element with a cooling fluid; the provision of a construction as above described in which support forming means is provided in enclosing relationship with respect to the mold-forming element and means are provided for cooling the mold-forming element by filling the space between it and the support forming means with a cooling fluid; the provision of apparatus of the type described above including novel form of means for heating marginal portions of the sheet of plastic material between the mold and the cover; the provision of a mold cover of novel construction adapted to reduce the stress applied to the sheet of plastic material during the bending operation by insuring ample heat to the plastic material along the line of maximum bend thereof; and the provision of molding apparatus of the type described having certain other new and novel features of construction.

The above being among the objects of the present invention, the same consists of certain new and novel features of construction and combinations of parts, together with certain novel steps of operation, to be hereinafter described with reference to the accompanying drawings, and then claimed, having the above and other objects in view.

In the accompanying drawings which illustrate a suitable embodiment of the apparatus of the present invention by means of which the steps of operation of the present invention may be successfully carried out, and in which like numerals refer to like parts throughout the several different views:

Fig. 1 is a plan view of molding apparatus employed in the molding of a flat sheet of plastic material to a desired size, shape and contour in accordance with the present invention;

Fig. 2 is a side elevational view of the apparatus shown in Fig. 1 together with liquid storage and circulating apparatus therefor shown in a more or less diagrammatic manner to illustrate its application thereto;

Fig. 3 is an enlarged vertical transverse sectional view taken on the line 3—3 of Fig. 2;

Fig. 4 is an enlarged fragmentary transverse sectional view taken on the line 4—4 of Fig. 2;

Fig. 5 is a fragmentary plan view of the structure shown in Fig. 4 taken as on the line 5—5 of Fig. 4;

Fig. 6 is an enlarged fragmentary transverse sectional view taken as on the line 6—6 of Fig. 1 and illustrating the seal employed between the cover and the mold for sealing the plastic thereto; and Fig. 7 is a reduced perspective view of the finished product produced by the particular form of apparatus shown in the drawings by way of illustrating the application of the present invention.

The present invention relates to a method and apparatus for acting upon a flat sheet of plastic material for the purpose of causing it to be formed into an article of desired size, shape and contour. Sheets of any thermoplastic material such as cellulose acetate or any of the more recent well-known thermoplastic resins or the like suitable for use in the desired final product may be employed. Likewise, sheets of any suitable thermosetting plastic, resins or the like may be employed when in their partially cured state or condition at which time they may be rendered further plastic by the application of heat thereto if necessary and, in any case, will be brought to their finally cured condition by the application of further heat thereto. For the purposes of explanation herein, it will be assumed, as a matter of illustration, that the particular sheet of plastic material to be operated upon is formed of a thermoplastic material, for instance, cellulose acetate.

The present invention is applicable to the molding of plastic bodies from sheets of plastic material regardless of the size of the body as long as a single unitary sheet of plastic material of sufficient size may be obtained to form the same therefrom, and it may be formed in accordance with the invention to substantially any desired size, shape or contour. The sheet of plastic material may be either of the plain or of the laminated type, the latter being preferable in many cases because of increased strength of the final product. In the particular case shown in the drawings by way of illustration, it is assumed that it is desired to form one-half of a generally torpedo-shaped body, specifically one-half of a body for a so-called "external jettison auxiliary fuel tank" such as are now commonly employed on aircraft to increase the fuel capacity thereof in order to extend the normal range of operation thereof.

As indicated in Fig. 7, the half of such tank thus formed by the specific apparatus shown by way of illustration is composed of a body of semicircular cross-sectional configuration varying in dimension longitudinally thereof and it is provided with an outwardly directed flange 12 around its open side, the flange 12 being continuous and lying in a single plane. In practice, two of the bodies such as shown in Fig. 7 are applied together with their open sides in opposed relationship and the flanges 12 in contact with each other, the flanges 12 being secured together to form the final product. The relative size of the flange shown in Fig. 7 is greater than that employed in the final product, being of the same size as received from the mold or die. Such flanges may be either partially or completely removed in the final product, depending upon the type of product being formed, its method of securement to other parts, or upon other conditions.

Referring now to the drawings, the mold comprises a body 14 of metal which may be formed in one part, or a number of parts suitably secured together as shown, and formed to provide a mold depression 16 of the exact size, shape and contour as the exterior size, shape and contour of the major portion of the article to be formed. The body 14 is preferably of no greater thickness than that required to withstand the pressure to which it is subjected in practice without substantial deformation thereof and is preferably exteriorly finned or ribbed as at 18 to enhance the rate of heat transfer therefrom for reasons which will hereinafter be apparent. Preferably, although not necessarily, in order to further enhance the heat transfer quality of the mold, it is formed from a light metal such as aluminum, magnesium, or alloys of these metals.

At its open side, the mold 14 is provided with an outwardly projecting flange portion 20, shown as formed integrally therewith in the embodiment shown by way of illustration. The flange 20 has a plain upper face 22 disposed perpendicular to the vertical central plane of the mold depression 16. The edge formed at the junction of the mold depression 16 and the face 22 is preferably rounded off as indicated at 24 in Fig. 6 so as to eliminate an excessively sharp bend in the sheet of plastic material when being formed.

The mold may be supported in any suitable manner, that is, by legs, a framework, or the like, but in the particular case shown it is supported by means of imperforate, vertically directed side walls 26 formed integrally therewith and connected thereto through the flange 22, the side walls extending downwardly and being outwardly flanged as at 28 around their lower margins to provide a support contacting face.

One step of the operation of forming a plastic member in accordance with the present invention by means of the apparatus shown consists of cooling the mold 14 and while, broadly, this may be accomplished in any suitable manner such as by blowing or spraying a suitable fluid against the outer surface of the mold 14, it is preferred to surround the outer surface of the mold 14 with a body of preferably refrigerated liquid. In order to enable this to be done, a horizontal wall 30 is extended between and sealed to the side walls 26 at a point spaced above the lower edge thereof so as to form a liquid-tight chamber 32 between it, the side wall 26, and the mold 14.

In operation, a flat sheet of plastic material of the type described and indicated at 34 is first cut to a shape substantially conforming to the shape of the outer edges of the flange 20 of the mold 14, is applied to the flat surface 22 with its edges aligned with the outer edges of the flange 20, and is sealed to such flat face 22 by means of a cover indicated generally at 36. In the broader aspects of the invention the cover 36 may comprise any sufficiently rigid member of substantially the same contour of the outer edges of the flange 20 and having a flat lower face adapted for complementary reception on the flat face 22 with the marginal edges of the plastic sheet 34 interposed therebetween. Particularly where the sheet of plastic is relatively thin, the time required to bring it to the proper temperature for the drawing operation is not important. However, in accordance with a more limited phase of the present invention, the cover is hollow so as to permit circulation of a heating fluid therethrough, thus to enable heat to be applied to both the upper and lower faces of the plastic sheet in order to cut down the time required to bring the plastic sheet to the desired state of plasticity required in the forming operation. This feature is particularly desirable in molding plastic sheets of material thickness.

In the particular case shown, the cover 36 comprises a frame-like member 38 of constant thickness and of an exterior size, shape and contour conforming to that of the flange 20. It may be conveniently formed from a suitable metallic plate. It is centrally provided with, or if formed from a plate is centrally cut away to provide, an opening therein of a size, shape and contour closely conforming to that of the open side of the mold depression 16. Preferably, and in accordance with the more limited phase of the invention, the lower inner corner of the plate 38 is outwardly and downwardly beveled as at 40 for a purpose which will hereinafter be explained.

A metal strip 42, arranged so that its plane of thickness is perpendicular to the member 38, is secured to the upper face of the member 38 as by welding or the like, and extends around the outer periphery thereof in flush relationship with such outer periphery. A similar strip 44 is similarly extended around the inner periphery of the member 38 in inwardly spaced relation to the strip 42. A solid plate member 48 of the same peripheral size, shape and contour as the flange 20 and member 38 is then secured in sealed and overlying relationship with respect to the upper edges of the strips 42 and 44, as shown. A relatively thin metallic plate 50 is extended between and sealed to the inner margins of the plate member 38 and is set into such lower margins, as best illustrated in Fig. 6, so that its lower face is flush with the lower face of the member 38. Thus, a chamber 52 is formed interiorly of the cover 36, which chamber is of the same contour as the open upper end of the mold depression 16 and is of the same size thereof except adjacent its bottom, where it is laterally outwardly extended because of the bevel 40, to a point outwardly of the outer margins of the mold depression 16. Preferably, the cover 36 is reinforced against distortion by means of angle sectional webs or flanges 54 projecting upwardly from and suitably fixed to the upper face of the member 48, as shown.

The cover 36 may be removably secured with respect to the mold 14 in any suitable or conventional manner, but preferably through some form of quick acting clamping means. In the particular case shown in the drawings by way of illustration, such clamping means are as follows. At spaced intervals around the upper edges of the side walls 26, a plurality of pads 60 are provided, shown as being formed integrally therewith. Each pad 60 is provided with a flat, vertically directed outer face to which is suitably secured the flat base 62 of a clamping device. Only one clamping device is shown in Fig. 2, in order to simplify the drawing, it being understood that in practice a clamping device will be mounted on all the pads 60.

Adjacent its upper edge, each base 62 is provided with a pair of laterally spaced, outwardly projecting ears or bosses 64, between which is received and to which is pivoted between its ends by means of a horizontally disposed pin 66, a double armed lever 68 having an inwardly directed or hooked upper end. A cylinder and piston assembly indicated generally at 70 is interposed between the lower free end of each lever 68 and its corresponding base 62. Each cylinder and piston assembly 70 is arranged to exert an outward pressure on the lower end of the corresponding lever 68 when pressure is applied thereto, and a spring 72 is provided between the lower arm of each lever 68 and the corresponding base 62 constantly urging the lever 68 in a direction of rotation opposite to that in which it is actuated by the piston and cylinder assembly 70. When a piston and cylinder assembly 70 is actuated by the application of fluid pressure thereto, the upper hooked end of the corresponding lever 68 is swung inwardly and downwardly into engagement with the upper outer marginal edge of the cover 36 and applies pressure thereto tending to force the cover 36 downwardly toward the flat surface 22 of the mold flange 20, thus to clamp the outer marginal edges of the sheet 34 of plastic between the cover and the flange 22. When the fluid pressure applied to the piston and cylinder assembly 70 is relieved, then the spring 72 acts to shift the lever 68 in a direction to bring the upper hooked end thereof upwardly out of contact with the cover 36 and sufficiently laterally outwardly therefrom as to permit the cover to be lifted without interference from the lever 68. It will, of course, be understood that in practice all of the cylinder and piston assemblies 70 are connected to a single source of fluid pressure and are all controlled by a single valve.

Particularly where the cover 36 is relatively large and heavy, as assumed in the particular case under consideration, it is preferable to provide power means for lifting the cover 36 so as to permit the introduction of a sheet 34 of plastic between it and the mold and to permit removal of the plastic sheet in molded condition from the mold. While in the broader aspects of the invention such lifting of the cover may be accomplished in any suitable manner, in the particular case shown the plate member 38 of the cover 36 is extended as at 76 at each end thereof and a fluid pressure actuated jack or lift comprising a vertically directed cylinder 78 and cooperating piston 80 is positioned under each end 76. Fluid under pressure introduced into the lower end of the cylinders 78, as through conduits 82, acts against the lower ends of the pistons 80, forcing the pistons 80 upwardly in the cylinders 78 and lifting the cover 36 therewith. Upward movement of the cover 36 under the influence of the cylinder and piston assemblies thus described may be limited by forming a lug such as 84 on each cylinder 78 and projecting outwardly therefrom and providing a vertically directed rod 86 connected to each end 76 and slidably projecting down through the corresponding lugs 84. Each rod 86 is provided with a head 88 thereon which, when the pistons 80 have moved vertically the desired distance, will contact the corresponding lugs 84 and thus limit such upward movement of the pistons 80 and the cover 36. The weight of the cover 36 and the pistons 80 will ordinarily be sufficient to cause them to move downwardly when the fluid pressure in the cylinders 78 is relieved.

In some cases, it will be found advisable to provide means in addition to the opposed flat faces of the flange 20 and the plate member 38 to seal the margins of the plastic sheet 34 between them during the molding operation, and in Fig. 6 one form of such sealing means is illustrated.

Referring to Fig. 6, it will be noted that a groove 90 is formed in the lower face of the member 38. The groove 90 is preferably continuous around the member 38 in parallel and spaced relation with respect to the inner margin thereof. A similar groove 92 is formed in the upper face 22 of the flange 20, but is preferably outwardly offset from the groove 90 by such a distance that its inner edge is approximately aligned with the outer edge of the groove 90. A strip 94 of suitable resilient material capable of being compressed, such as cork or other suitable non-metallic material, fills each groove 90 and 92. The strips 94 are preferably of such depth or vertical dimension that, as brought out in Fig. 6, before the cover 36 is clamped down upon the mold, the strips 94 will project a short distance beyond the faces of the corresponding members, so that when the cover is clamped to the mold to bring the opposed faces of the flange 20 and plate member 38 into flat contacting engagement with respect to the margins of the plastic sheet 34, the strips 94 will be firmly compressed against the opposite faces of the plastic sheet 34. This has been found to produce an effective seal.

In practice, when it is desired to mold a sheet of plastic, then a flat sheet of plastic as described is positioned between the mold and the cover as shown in Fig. 3 and the mold is filled with a heated fluid in order to heat the sheet 34 of plastic so as to soften it for the subsequent molding operation. Where the cover 36 is hollow, as shown and described, then such heated fluid is also preferably applied to the chamber 52 to heat the cover, thus to cause the plastic sheet to be heated from both sides. In order to introduce liquid into the mold cavity 16, the mold 14 at its lowest point is provided with a hollow boss 100, best brought out in Fig. 4, the bore of which opens into the mold cavity 16. A pipe 102 is threaded into the lower end of the bore of the boss 100.

The pipe 102 is preferably of relatively large size so as to permit a maximum flow of fluid into the mold cavity and the bore of the boss 100 is preferably of a commensurate size. In order to prevent the plastic from being extruded into the bore of the boss 100 under the pressure applied to it to cause it to conform to the size, shape and contour of the mold depression 16, means of the character illustrated in Figs. 4 and 5, or equivalent means, are preferably provided for permitting the free flow of fluid through the pipe 102 into the mold depression 16 but forming a support for the plastic over the bore in the boss when the fluid is expelled from the mold cavity and the plastic sheet 34 forced against the walls of the same.

The particular means shown for the above described purpose comprises a ring-like support 104 set into the mold 14 in concentric relation with respect to the bore of the boss 100 and secured therein by means of screws 106. The upper face of member 104 is made to conform to the contour of the mold cavity 16, as shown. The member 104 is provided with a central hub 108 connected thereto by means of a spider structure or radial arms 110 permitting the free flow of fluid between the hub 108 and the outer portion of the member 104. The hub portion 108 vertically, slidably receives the stem 111 of a poppet valve-like part having a head 112. The member 104 is formed to provide a seat 114 for receiving the periphery of the head 112 when the latter is in its lowered position which it may assume under the force of gravity. A cross-pin 116, projected through the stem 111 below the hub 108 is received in a diametrically disposed slot in the lower end of the hub 108. It therefore limits upward movement of the stem 111 and head 112 and prevents rotation of the stem 111 and head 112.

When fluid under pressure is applied to the pipe 102, it causes the stem 111 and head 112 to lift and thus freely opens the passage through the member 104 to the flow of fluid into the mold cavity 16. On the other hand, when the flow of fluid through the pipe 102 into the mold cavity is discontinued, then the pin 111 and the head 112 may drop by gravity to bring the head 112 into seating relation with respect to its seat 114. In such closed position, the upper surface of the head 112 forms a continuation of the desired contour of the mold depression 16.

When, as assumed in the case under consideration, the fluid in the mold cavity 16 is discharged through the pipe 102 as well as introduced into the mold cavity therethrough, then the head member 112 is provided with a plurality of openings such as 118 therein through which the fluid may escape from the mold cavity 16. The openings 118 may each be relatively small so that no material extrusion of the plastic sheet 34 therethrough under the molding pressure will occur.

The fluid used for heating the plastic sheet 34 is preferably a liquid introduced in heated condition into the mold cavity. For this purpose a tank 120, shown more-or-less diagrammatically in Fig. 2, is provided as a reservoir for such liquid, the capacity of the tank being, of course, in excess of the volume of the mold cavity 16 and the chamber 52 in the cover 36. A suitable heating means associated therewith, illustrated as a heating coil 122, is provided for bringing the temperature of the liquid in the tank 120 up to, and maintaining it at, the desired value.

In the interest of speeding up production, it is, of course, desirable that the liquid from the tank 120 fill the mold cavity 16 in the shortest time possible, and although any suitable type of pumping means may be employed for effecting this transfer, in view of the fact that the liquid transmitted to the mold cavity 16 is not required to be under any more than a nominal pressure, and particularly where, as in the particular case shown, it is desired to return the liquid from the mold cavity to the tank 120 through the pump, a centrifugal type of pump, such as indicated at 124, is preferably employed in the pipe line 102 connecting the mold cavity with the tank 120. The pump 124 may be driven in any suitable manner. A branch 126 of the pipe 102, including a flexible hose section 128, connects the discharge side of the pump 124 with the chamber 52 in the cover 36.

It is, of course, necessary to allow for the escape of air within the mold cavity 16 when the liquid from the tank 120 is introduced thereinto, and the means provided for the escape of such air may also serve as the means for permitting circulation of the liquid through the mold cavity during the heating operation. For this purpose, a pipe 130 is connected into the mold cavity 16 at each end thereof and immediately adjacent the upper edge thereof at each end of the mold cavity and in constant open communication therewith. The pipes 130 are connected back into the tank 120 so that when the pump 124 is actuated to fill the mold cavity 16, the air in the mold cavity will escape through the pipes 130 to the tank 120 and from the tank 120 to the atmosphere. As soon as the mold cavity 16 is filled with the liquid from the tank 120, the liquid will overflow through the pipes 130 and be returned to the tank 120, thus to permit circulation of the liquid.

Branches 132 of the pipes 130, including flexible hose portions 134, allow for the escape of air in the chamber 52 in the cover 36, as well as for the circulation of the heating liquid through the chamber 52. In this connection it will, of course, be appreciated that the flexible hose portions 128 and 134 connected to the cover 36 include a sufficient amount of slack to permit raising and lowering of the cover as previously described without necessitating the disconnection of the cover from the pump 124.

It is, of course, the heat from the liquid in the tank 120 which, when transmitted to the plastic sheet 34, brings the latter to a temperature at which it is sufficiently soft or plastic to permit its being molded to the desired shape. Additionally, such liquid heats the mold 14 so that when the plastic sheet 34 comes into contact with it, it will not be chilled during the molding process to an extent to interfere with its moldability. While the pressure of the liquid discharged into the mold cavity 16 by the pump 124 is not a high pressure, it will be appreciated that it will be sufficient to force sheet 34 up into contact with the plate member 50 on the bottom face of the cover 36 and the sheet will thus also absorb heat from the plate 50 and thus be heated from both sides. In this connection the importance of providing the bevel 40 previously described will be apparent as it will be noted from an inspection of Fig. 6 that the bevel 40 permits a body of the heated liquid to extend outwardly of the margin of the mold cavity 16 so as to effectively heat the plate member 50 beyond such margin. This insures that enough of the plastic sheet 34 outwardly of the mold depression 16 will be sufficiently softened so as to permit the sheet to readily bend over the edge 24 between the cavity 16 and the surface 22 into conformance with the sides of the mold depressions during the molding operation. The rounding of the edge 24, as shown in Fig. 6, not only aids the bending of the plastic sheet as thus softened as above described but aids in eliminating a sharp bend which might otherwise tend to break the plastic sheet at this point if not brought to a sufficiently soft condition.

When the plastic sheet 34 has been sufficiently softened by the application of heat through the liquid in the tank 120 thereto it is caused to conform to the shape of the mold depression 16 by the application of fluid pressure to its upper face. Such fluid pressure is supplied in the form of air pressure transmitted thereto through an air line 140 extending longitudinally of the cover 36, over the same, and provided with a plurality of branches 142 which project down through the cover 36 and open upon the lower face thereof, said branches being suitably sealed to the upper and lower members 48 and 50, respectively, of the cover 36. The line 140 is connected by a flexible hose 144 with a suitable source of air under pressure and a valve 146 is provided in the line 140 to control the flow of air therethrough to the various branches 142.

The application of air from the pipe line 140 through the various branches 142 to the upper face of the softened sheet of plastic 34 is accompanied by a simultaneous stopping of the pump 124 if the latter has not already been stopped, the application of the air to between the cover 36 and the upper face of the plastic sheet 34 causing the plastic sheet 34 to be deformed into contact with the walls of the mold cavity 16 and simultaneously displaces the heated fluid from between the sheet of plastic material 34 and the mold cavity 16. When the pump 124 is stopped operating and the flow of fluid through the pipe 102 and pump 124 is reversed the stem 111 and its head 112 drop, the head 112 coming to rest against the seat 114 on the member 104 and the hot liquid is thus ejected through the openings 118 in the head 112. During the initial depression of the plastic sheet 34 under the influence of air under pressure introduced between it and the cover 36 some of the liquid may also escape through the pipes 130 and be returned to the tank 120 in this manner, but it will be appreciated that the bulk of the liquid will be returned through the pipe 102 and its flow will continue until the plastic sheet 34 in being pressed against the walls of the mold depression 16 has ejected all of heated liquid from the mold depression.

When the plastic sheet 34 has thus been made to completely conform to the inner walls of the mold depression 16, then it is cooled, or allowed to become sufficiently cool so as to again become rigid. Inasmuch as the mold 14 has, of course, become heated through contact with the heated liquid from the tank 120, if the formed plastic was allowed to cool simply through natural cooling of the mold and its associated parts a considerable time element would be required. For this reason and particularly in quantity production of the molded parts it is desired to provide means for rapidly cooling the mold, and consequently the molded plastic body therein. As previously explained this is accomplished in accordance with the particular embodiment of the apparatus shown by filling the chamber 32 with the coolant liquid and this is accomplished in the following manner.

A tank 150, shown more or less diagrammatically in Fig. 2, is connected by a pipe line 152 through a pump 154 with the chamber 32 through the bottom wall 30 thereof. A pipe line 156 connected at opposite ends of the apparatus with the highest points in the chamber 32 leads back to the upper end of the tank 150. Preferably the liquid in the tank 150 is refrigerated to a greater or lesser extent and as illustrative of a suitable method of accomplishment such refrigeration the tank 150 is shown as being provided with a cooling coil 158 therein through which a suitable refrigerant may be circulated in a conventional manner. Accordingly, when a sufficient time element has elapsed from the time the air under pressure in the pipe line 140 has been introduced to between the plastic sheet 34 and the cover 36 to insure the plastic sheet having been forced into complementary conformation with respect to the depression 16 of the mold 14, and while such air pressure is maintained upon the plastic, the pump 154 is actuated to withdraw liquid from the tank 150 and fill the chamber 32. The refrigerated liquid in thus rushing into the chamber 32 will displace air therefrom out through the pipes 156 to the tank 150 from which such air will escape to the atmosphere, and after the chamber 32 has once been filled the pump will circulate the refrigerated liquid from the tank 150 through the chamber 32 and out through the pipe lines 156 back to the tank, and this circulation will continue for a sufficient length of time to insure that the temperature of the plastic body thus formed as above described in the mold cavity 16 has been cooled sufficiently to enable it to retain its shape, whereupon the pump 154 may be stopped, thus allowing the refrigerated liquid in the chamber 32 to return to the tank 150 under gravity where the tank 150 is below the mold, or such liquid may be pumped back to the tank 150 where the mold is on a level with, or above, the mold.

From the above it will be appreciated that in carrying out the method of the present invention the tank 120 is filled with a suitable liquid which is brought to a desired temperature by means of the coil 122 or equivalent. Obviously the temperature of the liquid in the tank 120 and consequently the temperature to which the plastic sheet 34 will be subjected will depend upon the particular type of plastic material being utilized for the forming operation. As a matter of illustration it may be stated that when the plastic sheet 34 is formed from cellulose acetate the liquid in the tank 120 is preferably brought to a temperature of from 325 to 350° F. The liquid employed may be any suitable type of liquid not adversely affecting the plastic material and capable of being heated to this temperature without deleterious effects thereon or boiling of the liquid. Oil is suitable for this use but it has been found that ethylene glycol is superior to oil inasmuch as by its use the transfer of heat from it to the sheet of plastic appears to be more rapid than when oil is used.

Additionally, the tank 150 is filled with liquid which may be refrigerated to the desired low temperature without materially increasing its viscosity. Water will usually be found sufficient to use for this purpose and its temperature may be reduced by the refrigerating coils 158 preferably to a temperature of from 35 to 55° F. The liquid in the two tanks 120 and 150 thus having been brought to the desired temperature, it will usually be desirable to bring the cover 36 and particularly the plate member 50 thereof up to the temperature of the oil in the tank 120 prior to inserting the plastic sheet 34 in the mold and in such case the valve 160 positioned in the pipe 102 between the branch 126 and the mold cavity 16 may be closed and the pump 124 placed in operation thus to cause the heated liquid to circulate through the chamber 52 only.

Under the above described circumstances and assuming that the cover 36 has been brought up to the desired temperature, fluid under pressure is applied to the lower end of the pistons 80 in the cylinder 78 and the cover 36 is raised if not already in this position. Then a flat sheet of plastic 34 which has been previously cut to conform to the outline of the periphery of the flange 20 of the mold 14 is positioned upon the flat surface 22 of the flange 20 in peripheral alignment with the periphery of the flange 20, whereupon the fluid pressure in the cylinders 78 is relieved and the cover 36 is allowed to descend upon the plastic sheet 34, whereupon fluid pressure is applied to the cylinder and piston assemblies 70 of the clamping means thereby to actuate the clamping arms or levers 68 to firmly draw the cover 36 down toward the mold 14 and clamp the marginal edge portions of the plastic sheet 34 therebetween. This having been done the valve 160 is opened so as to flood the mold cavity 16 with the hot liquid from the tank 120, such hot liquid flowing up into contact with the lower face of the plastic sheet 34 thereby to heat it and raise it to the desired temperature required to soften it sufficiently to permit the subsequent molding operation thereon.

The time which the hot liquid in the tank 120 must be allowed to remain in contact with the plastic sheet 34 to soften it to the desired extent will, of course, depend upon the particular material from which the sheet is formed, the thickness of the plastic sheet 34, the temperature of the liquid in contact with the sheet, the rapidity with which the heat from the liquid is transmitted to the plastic sheet, and whether or not the cover 36 is heated. In the case of cellulose acetate and a liquid temperature of from 325 to 350° F. as in the specific example above given, where the cover 36 is heated as described, and where the plastic sheet is from one-quarter to five-sixteenths of an inch thick, a time period of from two and one-half to three minutes is usually required where the heating liquid is oil. Where ethylene glycol is employed instead of oil then this time period may be cut down to about two minutes. When such time element has elapsed after application of the heated liquid to the cavity 16, then the pump 124 is stopped and the valve 146 controlling the flow of air to the pipe line 140 is opened and air under pressure then flows through the branches 142 to between the plastic sheet 34 and the cover 36. Such air may, if desired, also be heated but no material benefit has been found in doing so.

The air pressure employed must, of course, be sufficient to cause the softened plastic sheet to stretch and conform to the mold cavity and the amount of pressure so used will, of course, depend upon the thickness of the plastic sheet, the amount which must be stretched in order to conform to the mold cavity, and to other considerations. In the case of the particular example given and where forming the article illustrated in Fig. 7 which is approximately thirteen feet long, and with a maximum radius of eighteen inches comprising the maximum draw or deformation required, an air pressure of from 35 to 60 pounds per square inch has been found suitable. In such case and in the specific example given it usually requires approximately one and three-quarters minutes to insure the plastic sheet driving out all of the hot liquid trapped in the mold cavity 16 and cause the plastic sheet to fully conform to the interior surfaces of the mold cavity 16. It will be understood, of course, that during this forming operation the marginal portion of the plastic sheet 34 clamped between the cover and the mold is securely maintained in such position and it is only that portion of the plastic sheet overlying the open face of the mold cavity, and perhaps a slight portion thereof extending away from each open edge that is stretched out during the forming operation. The hot liquid in the cavity 16 remains in contact with the plastic material until the latter is in substantially its final form and, of course, the mold 14 is heated at such time through its contact with the heating liquid so that although the plastic material is in contact with the mold it is still in a condition enabling it to be readily stretched.

When the air pressure has been applied to the upper face of the plastic sheet for a sufficient length of time to insure its conformance to the wall of the mold cavity, and while the air pressure is still maintained thereon, the pump 154 is put into operation and this substantially immediately fills the interior of the chamber 32 with the refrigerated liquid from the tank 150. This refrigerated liquid quickly withdraws heat from the mold 14 and the mold 14 in turn withdraws the heat from the formed plastic within the mold cavity 16 and as soon as the molded plastic body has thus been sufficiently cooled to insure its retaining its molded shape, it may be removed from the mold. The time required for this cooling operation will, of course, vary in accordance with the temperature of the cooling liquid, the thickness of the plastic sheet, the thickness of the mold and the material from which it is formed, and other factors, but in the specific example given by way of illustration and where the mold 14 is formed from aluminum, a period of two to three minutes will usually be found sufficient to set the plastic material in its molded condition, upon which the pump 154 may be stopped, the valve 146 controlling the flow of air to the molds shut off, the clamping arms 68 released by relieving the pressure applied to the piston and cylinder assemblies 70, and then fluid pressure may be applied to the lower ends of the cylinders 78 to lift the cover 36, whereupon the molded article may be removed from the mold.

By the method described molded plastic articles may be quickly and accurately formed from sheets of plastic to their final size, shape and contour in a quick and efficient manner.

Having thus described my invention, what I claim by Letters Patent is:

1. In the molding of plastic bodies by the use of a mold having a mold cavity therein and a cover for the open face of the cavity, the steps of clamping a flat sheet of plastic material between said cover and said mold, flooding the interior of said mold cavity with a heated liquid in contact with said sheet until said sheet has been softened, and then applying gas pressure between said cover and said sheet whereby to cause such softened sheet to be stretched into contact with the walls of said cavity and force said heated liquid from said cavity, and removing said molded material from said cavity after it has cooled sufficiently to retain its molded shape.

2. In the molding of plastic bodies by the use of a mold having a mold cavity therein and a cover for the open face of the cavity, the steps of clamping a flat sheet of plastic material between said cover and said mold, flooding the interior of said mold cavity with a heated liquid in contact with said sheet until said sheet has been softened, and then applying gas pressure between said cover and said sheet whereby to cause such softened sheet to be stretched into contact with the walls of said cavity and force said heated liquid from said cavity, then artificially cooling said mold by applying a cooling medium to the exterior surfaces thereof, and then removing said molded material from said cavity when it has cooled sufficiently to retain its molded shape.

3. In the molding of bodies formed from plastic material by means of a mold having a mold cavity therein and a hollow cover for the mold having a substantially flat face for application to the face of the mold in which cavity is formed, the steps of interposing a flat sheet of plastic material between said cover and said mold over the open face of said mold cavity and clamping the marginal edges thereof between said cover and said mold, filling said cavity and said hollow cover with a heated fluid under a sufficient pressure to force said sheet into contact with said cover over the area of the open face of said mold thereby to apply heat to said sheet until the material thereof has been softened sufficiently to permit the required stretching thereof, then discontinuing the flow of said heated fluid to said mold cavity and applying gas under pressure to between said sheet and said cover whereby to cause said softened sheet to be stretched into conformance with the size, shape and contour of said mold cavity and force said heated fluid from said mold cavity and maintaining said gaseous pressure on said sheet until the material thereof has cooled sufficiently to retain its thus stretched shape.

4. In the molding of bodies formed from plastic material by means of a mold having a mold cavity therein and a hollow cover for the mold having a substantially flat face for application to the face of the mold in which cavity is formed, the steps of interposing a flat sheet of plastic material between said cover and said mold over the open face of said mold cavity and clamping the marginal edges thereof between said cover and said mold, filling said cavity and said hollow cover with a heated fluid under a sufficient pressure to force said sheet into contact with said cover over the area of the open face of said mold thereby to apply heat to said sheet until the material thereof has been softened sufficiently to permit the required stretching thereof, then discontinuing the flow of said heated fluid to said mold cavity and applying gas under pressure to between said sheet and said cover whereby to cause said softened sheet to be stretched into conformance with the size, shape and contour of said mold cavity and force said heated fluid from said mold cavity, then applying a cooling fluid to the exterior surface of that portion of said mold in which said cavity is formed, and maintaining said gaseous pressure on said sheet until the material thereof has cooled sufficiently to retain its thus stretched shape.

5. In a molding of bodies formed from plastic material by means of a mold having a mold cavity therein and a hollow cover for the mold having a substantially flat face for application to the face of the mold in which cavity is formed, the steps of interposing a flat sheet of plastic material between said cover and said mold over the open face of said mold cavity and clamping the marginal edges thereof between said cover and said mold, filling said cavity and said hollow cover with a heated fluid under a sufficient pressure to force said sheet into contact with said cover over the area of the open face of said mold thereby to apply heat to said sheet until the material thereof has been softened sufficiently to permit the required stretching thereof, then discontinuing the flow of said heated fluid to said mold cavity and applying gas under pressure to between said sheet and said cover whereby to cause said softened sheet to be stretched into conformance with the size, shape and contour of said mold cavity and force said heated fluid from said mold cavity, then flooding that wall of said mold opposed to the face of said mold depression with a heat absorbing liquid, and maintaining said gaseous pressure on said sheet until the material thereof has cooled sufficiently to retain its thus stretched shape.

6. Molding apparatus comprising a body having a substantially flat face and a mold cavity opening onto said face, a cover adapted to overlie said flat face and having a complementry flat face, clamping means associated between said mold and cover operable to draw said mold and cover relatively toward one another whereby to enable a sheet of plastic interposed between them to be marginally clamped between them, means operable to fill said mold cavity with a heated liquid, and means including a passage opening onto the flat face of said cover inwardly of the margins thereof for introducing air under pressure to said flat face.

7. Molding apparatus comprising a body having a substantially flat face and a mold cavity opening onto said face, a hollow cover adapted to overlie said flat face and having a complementary flat face, clamping means associated between said mold and cover operable to draw said mold and cover relatively toward one another whereby to enable a sheet of plastic interposed between them to be marginally clamped between them, means for filling said mold cavity and said hollow cover with a heated liquid, and means for introducing air under pressure to the said flat face of said cover at a point inwardly of the outer margins thereof.

8. Molding apparatus comprising a body having a substantially flat face and a mold cavity opening onto said face, a cover adapted to overlie said flat face and having a complementary flat face, clamping means associated between said mold and cover operable to draw said mold and cover relatively toward one another whereby to enable a sheet of plastic interposed between them to be marginally clamped between them, means operable to fill said mold cavity with a heated liquid, means including a passage opening onto the flat face of said cover inwardly of the margins thereof for introducing air under pressure to said flat face, and additional means for bathing said mold with a coolant liquid.

9. Molding apparatus comprising a body having a substantially flat face and a mold cavity opening onto said face, a cover adapted to overlie said flat face and having a complementary flat face, clamping means associated between said mold and cover operable to draw said mold and cover relatively toward one another whereby to enable a sheet of plastic interposed between them to be marginally clamped between them, means operable to fill said mold cavity with a heated liquid, means including a passage opening onto the flat face of said cover inwardly of the margins thereof for introducing air under pressure to said flat face, and means operable at will to surround said mold with a body of coolant liquid.

10. Plastic molding apparatus comprising, in combination, a mold having a substantially flat face and a mold cavity opening thereonto within the outer margins thereof, a cover having a flat face adapted to be arranged in flat and opposed relation with respect to said flat face of said mold, said cover being hollow and the interior cavity thereof extending outwardly beyond the margins of said cavity in said mold, clamping means operable to draw said cover and said mold relatively toward one another, means for introducing liquid to said mold cavity, and to the hollow interior of said cover, and means for introducing air to said flat face of said cover within that area thereof corresponding to the outer margins of said cavity.

11. Plastic molding apparatus comprising, in combination, a mold having a flat face and a mold cavity opening onto said face, a cover for closing said mold cavity and operable to clamp a sheet of plastic material between it and said flat face of said mold, a liquid containing tank, heating means associated with said tank for heating liquid therein, a pump operatively connected to said tank for withdrawing liquid therefrom, means connecting the discharge part of said pump with said mold cavity, a second liquid tank, means operatively associated with said tank for refrigerating liquid therein, a second pump operatively connected with said second tank to withdraw said refrigerated liquid therefrom, and means for delivering refrigerated liquid from said second pump to the exterior face of that wall of said mold in which said cavity is formed, and means for introducing air under pressure to that face of said cover opposed to said cavity in said mold.

12. Plastic molding apparatus comprising, in combination, a mold having a flat face and a mold cavity opening thereonto, said mold being formed to provide a chamber surrounding that wall thereof forming said cavity, a cover member overlying said flat face and said mold cavity, clamping means co-operable between said mold and said cover member for relatively drawing one toward the other thereof whereby to enable a sheet of plastic to be marginally clamped between them, a liquid tank, heating means operatively associated with said tank for heating liquid therein, means for withdrawing heated liquid from said tank and delivering it to said mold cavity, means for introducing air under pressure to that face of said cover opposed to said mold cavity, a second liquid tank, means for refrigerating liquid in said second tank, and means for delivering said refrigerated liquid from said second tank to said chamber.

WILLIAM HAROLD BAGLEY, JR.

REFERENCES CITED

The following references are of record in the file of this patent:

UNITED STATES PATENTS

| Number | Name | Date |
| --- | --- | --- |
| 2,234,839 | Edwards | Mar. 11, 1941 |
| 2,362,672 | Sloan | Nov. 14, 1944 |
| 2,295,066 | Weikert | Sept. 8, 1942 |
| 1,146,413 | Edison | July 13, 1915 |
| 1,221,450 | Hitchcock | Apr. 3, 1917 |

Certificate of Correction

Patent No. 2,422,999. June 24, 1947.

WILLIAM HAROLD BAGLEY, Jr.

It is hereby certified that error appears in the printed specification of the above numbered patent requiring correction as follows: Column 16, line 14, before the word "tank" second occurrence, insert *second*; and that the said Letters Patent should be read with this correction therein that the same may conform to the record of the case in the Patent Office.

Signed and sealed this 26th day of August, A. D. 1947.

[SEAL]

LESLIE FRAZER,
*First Assistant Commissioner of Patents.*